United States Patent
Jacobs

(10) Patent No.: US 6,691,011 B1
(45) Date of Patent: Feb. 10, 2004

(54) METHOD OF ESTIMATING VEHICLE DECELERATION DURING A TRANSMISSION GEAR SHIFT

(75) Inventor: Craig Steven Jacobs, Canton, MI (US)

(73) Assignee: Eaton Corporation, Southfield, MI (US)

( * ) Notice: Subject to any disclaimer, the term of this patent is extended or adjusted under 35 U.S.C. 154(b) by 0 days.

(21) Appl. No.: 10/448,821

(22) Filed: May 30, 2003

(51) Int. Cl.[7] .............................................. G06F 17/00
(52) U.S. Cl. .............................. 701/54; 701/55; 701/51; 477/34; 477/115
(58) Field of Search ............................. 701/54, 51, 53, 701/55, 56; 477/115, 120, 34

(56) References Cited

U.S. PATENT DOCUMENTS

| | | | |
|---|---|---|---|
| 5,053,963 A | * | 10/1991 | Mack .......................... 701/51 |
| 5,272,939 A | | 12/1993 | Markyvech et al. |
| 5,335,566 A | | 8/1994 | Genise et al. |
| 5,989,155 A | * | 11/1999 | Wadas et al. ............... 477/111 |
| 6,178,366 B1 | | 1/2001 | Janecke et al. |
| 6,325,743 B1 | | 12/2001 | Genise et al. |
| 6,394,931 B1 | | 5/2002 | Genise |
| 6,526,816 B2 | | 3/2003 | Genise et al. |

* cited by examiner

*Primary Examiner*—Richard M. Camby
(74) *Attorney, Agent, or Firm*—Brooks Kushman p.c.

(57) ABSTRACT

A method for estimating deceleration of a wheeled vehicle during a transmission gear shift. A first input signal indicative of an engine torque and a second signal indicative of an input shaft rotational speed are used to predict the expected vehicle deceleration during a transmission ratio shift to a target gear ratio. An expected vehicle deceleration value is outputted to a shift decision control unit for implementing a transmission gear shift.

19 Claims, 3 Drawing Sheets

METHOD OF ESTIMATING VEHICLE DECELERATION DURING A TRANSMISSION GEAR SHIFT

BACKGROUND OF THE INVENTION

1. Field of the Invention

The present invention relates to a method for estimating deceleration of a wheeled vehicle during a transmission gear shift.

2. Background Art

Wheeled vehicles, such as automobiles and trucks, have transmissions that adapt the power of an engine to meet varying road and load conditions. Such transmissions may have an input shaft connected to an engine and an output shaft adapted to drive vehicle traction wheels. The torque provided to the vehicle traction wheels by the output shaft is interrupted during a transmission gear shift. As a result, the speed of the vehicle may decrease during the gear shift.

Shift control systems, such as that disclosed in U.S. Pat. No. 5,272,939, use an engine torque value and a vehicle acceleration value to predict whether a shift is feasible before commencing a gear shift. These inputs must be heavily filtered or dampened to reduce noise due to vehicle driveline dynamics, such as the torsional vibrations. This filtering causes the filtered signals to lag real time signals and can result in late transmission gear shifts. In addition, the vehicle acceleration value is obtained by differentiating a shaft rotational velocity signal. Differentiating the rotational velocity signal increases the signal noise by a significant order of magnitude and may lead to suboptimal shift decisions that reduce fuel economy and degrade transmission performance.

SUMMARY OF THE INVENTION

According to the present invention, a method for estimating deceleration of a vehicle during a transmission gear shift is provided. The method includes the steps of determining an expected vehicle deceleration during a transmission gear ratio shift to a target gear ratio as a function of a first signal and a second signal and outputting the expected vehicle deceleration value to a shift decision control unit for implementing a transmission gear shift. The first signal is indicative of an engine torque and the second signal is indicative of an input shaft rotational speed. The first signal may be measured at the transmission output shaft or may be provided by an engine control module. The second signal may also be measured at the transmission output shaft.

The expected vehicle deceleration during the transmission gear shift may be calculated using the torque on the transmission due to vehicle drag forces, gross vehicle weight, and a constant. The constant may be a function of the axle ratio of the vehicle and the radius of a tire disposed on the vehicle.

According to another aspect of the invention, the method may comprise the steps of providing a set of initial values for a current time period, determining a set of estimated values for a future time period, providing an estimated vehicle deceleration value to a shift decision control unit, calculating a set of error values, calculating a set of correction values, and adjusting the set of estimated values using the set of correction values.

The set of initial values may include an engine torque value, an input shaft rotational speed value, and a vehicle deceleration value. The set of estimated values for a future time period may include an estimated engine torque value, an estimated input shaft rotational speed rotational value, and an estimated vehicle deceleration value. The step of providing the engine vehicle deceleration value to a shift decision control unit may be performed after adjusting the set of estimated values using the set of correctional values.

The set of error values may be based on the first signal, the second signal, and a subset of the set of estimated values. The subset of the set of estimated values may comprise the estimated engine torque value and the estimated input shaft rotational speed value. The set of estimated values may be used as the set of initial values in a future time period. The set of correction values may be calculated using the set of error values and a set of predetermined coefficients.

DETAILED DESCRIPTION OF THE PREFERRED EMBODIMENT(S)

Figure 1:
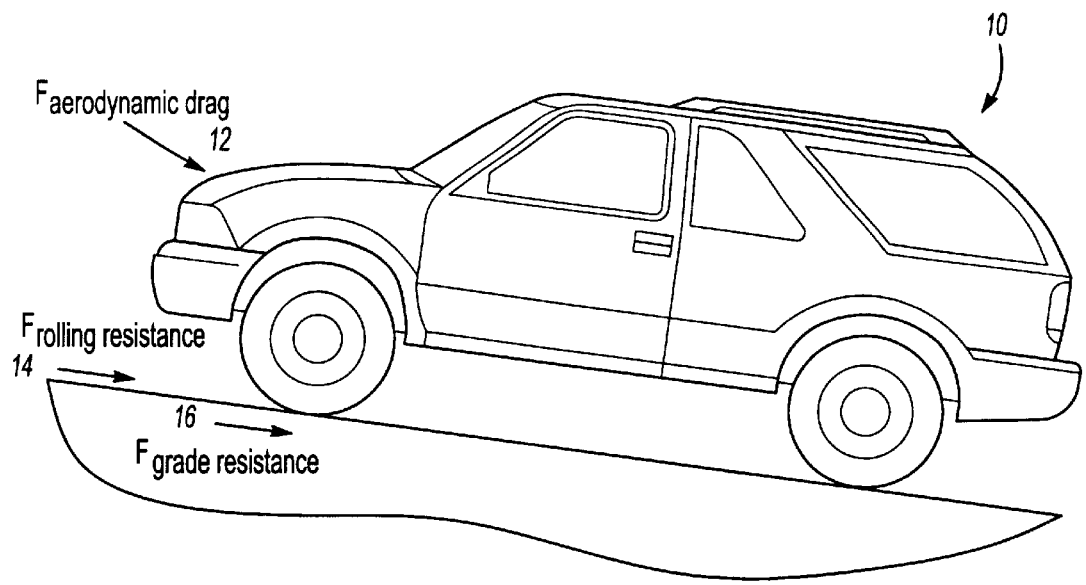
FIG. 1 is a schematic view of a vehicle and the resistive forces acting on the vehicle.

FIG. 1 shows a vehicle 10 traveling up a slight grade. Three resistive forces are shown acting on the vehicle 10. The first force 12 represents the aerodynamic drag on the vehicle 10. The second force 14 represents the rolling resistance due to the road surface and frictional effects. The third force 16 represents the grade resistance due to gravitational forces on the vehicle 10 caused by the slope of the road. These forces act to decelerate the vehicle 10 during a transmission gear shift.

Figure 2:
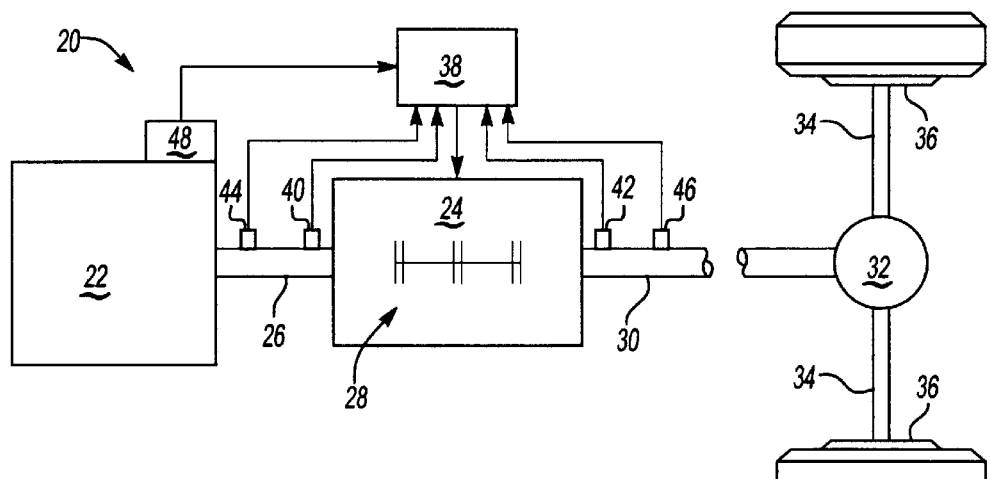
FIG. 2 is a schematic view of a vehicle transmission system.

FIG. 2 shows a transmission system 20 of the vehicle 10. The transmission system 20 includes an engine 22 connected to a transmission 24 via an input shaft 26. The transmission 24 includes a number of gear ratios 28 and an output shaft 30 that is adapted to drive vehicle traction wheels. Specifically, the output shaft 30 is connected to a differential 32 that is connected to a pair of axles 34 that are each connected to a vehicle wheel 36. When a gear ratio is engaged, the engine torque at the input shaft 26 is transmitted through the transmission 24 to the output shaft 30, differential 32, and axles 34 to turn the vehicle wheels 36.

The transmission system 20 includes a shift decision control unit 38 that processes inputs to determine whether a gear shift should be executed. These inputs include a rotational velocity signal and an engine torque signal. The rotational velocity signal may be provided by an input shaft speed sensor 40 or an output shaft speed sensor 42. The engine torque value may be provided by one or more torque sensors, such as an input shaft torque sensor 44 or an output shaft torque sensor 46, or by an engine control module 48 that monitors engine performance. In the present invention, the rotational velocity signal and the engine torque signal do not need to be filtered before being provided to the shift decision control unit 38.

The shift decision control unit 38 is connected to actuators (not shown) that shift the transmission 24 from a current gear ratio to a desired target gear ratio. When a decision is made to shift the transmission, the input shaft 26 is temporarily disengaged from the output shaft 30. As a result, the resistive forces 12, 14, 16 shown in FIG. 1 can decrease the speed of the vehicle 10 and consequently reduce the rotational velocity of the output shaft 30. By predicting the vehicle deceleration due to these resistive vehicle drag forces, a more accurate shift decision may be determined.

Figure 3:
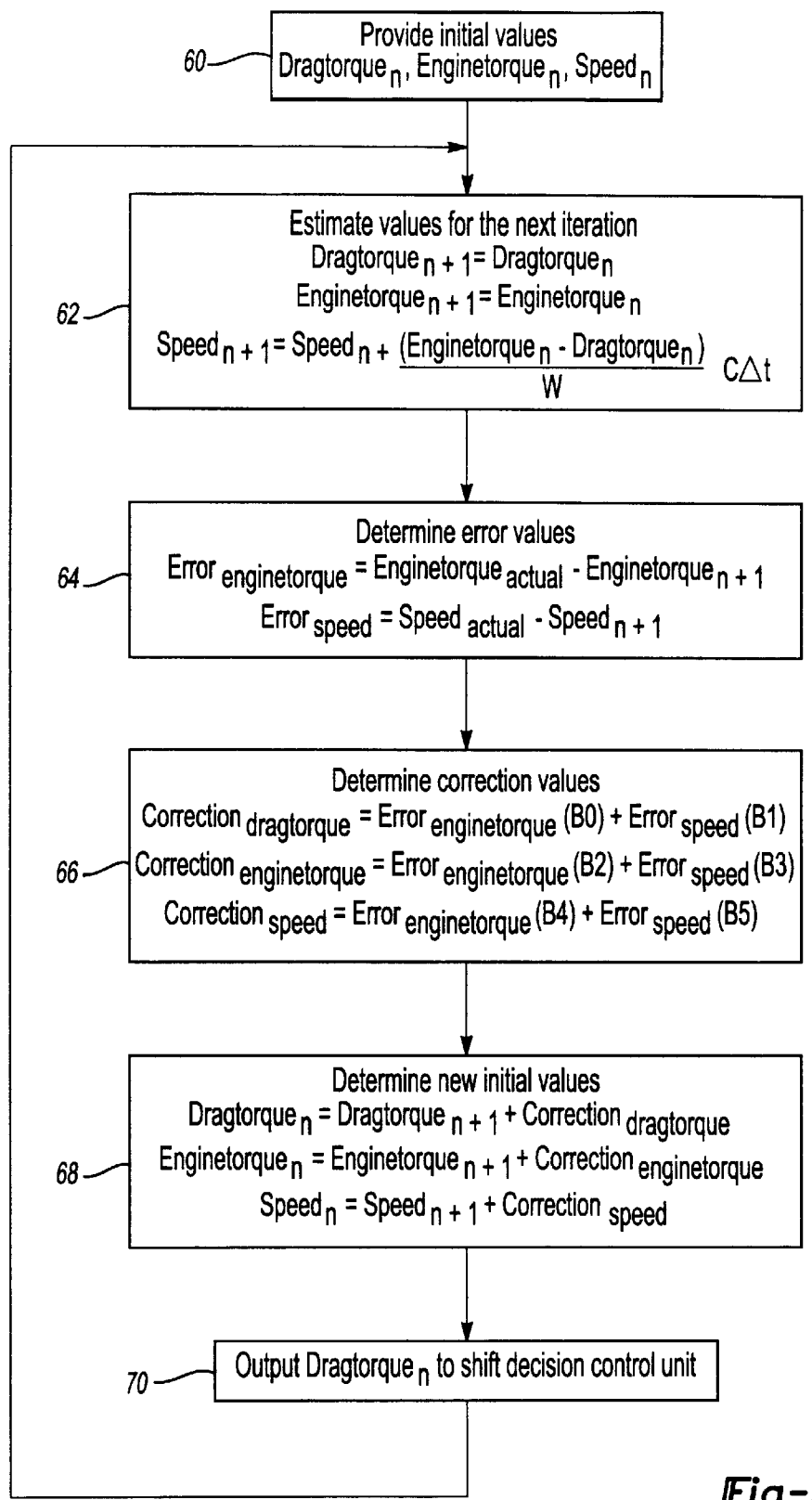
FIG. 3 is a flowchart of one embodiment of a method for determining deceleration of the vehicle during a transmission gear shift.

Referring to FIG. 3, a flowchart of one embodiment of the present invention is shown. At 60, a set of initial values for a current time period (n) is provided. The initial value set includes a current engine torque (Enginetorque$_n$), current input shaft rotational velocity (Speed$_n$), and current torque due to resistive forces acting on the vehicle (Dragtorque$_n$). Each initial value may be arbitrarily selected or may be based on test data or other quantitative assessments of the vehicle and transmission system performance.

Next, at 62, a set of estimated values for a future time period (n+1) are calculated. The estimated value set includes a predicted torque due to resistive forces acting on the vehicle (Dragtorque$_{n+1}$), a predicted engine torque (Enginetorque$_{n+1}$), and a predicted input shaft rotational speed (Speed$_{n+1}$). Dragtorque$_{n+1}$ and Enginetorque$_{n+1}$ are set equal to their initial values, Dragtorque$_n$ and Enginetorque$_n$, respectively. The predicted input shaft rotational speed (Speed$_{n+1}$) is determined by the relationship:

$$\text{Speed}_{n+1}=\text{Speed}_n+(\text{Enginetorque}_n-\text{Dragtorque}_n)/W * C\Delta t$$

where:
W=gross vehicle weight;
$\Delta t$=time between the current time period (n) and the future time period (n+1); and
C=a constant.

The constant C is determined as a function of the vehicle axle ratio and the tire radius. The value of the constant C depends on the units of measurement used. For example, if U.S. customary weights and measurements are used, (e.g., distance measured in feet and force measured in pounds), the constant C is determined by the expression:

$$307*(\text{ratio}_{axle}^2/\text{radius}_{tire}^2)$$

where:
ratio$_{axle}$ is the axle ratio of the vehicle; and
radius$_{tire}$ is the radius of the tire disposed on the vehicle.

In the next block 64, a set of error values is determined based on the difference between the estimated values and actual measured values. Specifically, Error$_{enginetorque}$ is the difference between the measured engine torque (Enginetorque$_{actual}$) and the estimated engine torque (Enginetorque$_{n+1}$) and is determined by the expression:

$$\text{Error}_{enginetorque}=\text{Enginetorque}_{actual}-\text{Enginetorque}_{n+1}$$

Likewise, Error$_{speed}$ is the difference between the measured input shaft rotational speed (Speed$_{actual}$) and the estimated input shaft rotational speed (Speed$_{n+1}$) and is determined by the expression:

$$\text{Error}_{speed}=\text{Speed}_{actual}-\text{Speed}_{n+1}$$

Next, at 66, a set of correction values is determined using the set of error values and correction coefficients. The correction coefficients are constants and are designated B0, B1, B2, B3, B4, and B5. Their values may be established arbitrarily or may be tailored to the particular powertrain characteristics of the vehicle as determined through testing and performance assessments. In the present embodiment, three correction values are determined. The first correction value (Correction$_{dragtorque}$) is determined by the expression:

$$\text{Correction}_{dragtorque}=\text{Error}_{enginetorque}\times B0+\text{Error}_{speed}\times B1$$

The second correction value (Correction$_{enginetorque}$) for the engine torque is determined by the expression:

$$\text{Correction}_{enginetorque}=\text{Error}_{enginetorque}\times B2+\text{Error}_{speed}\times B3$$

The third correction value for the rotational speed (Correction$_{speed}$) is determined by the expression:

$$\text{Correction}_{speed}=\text{Error}_{enginetorque}\times B4+\text{Error}_{speed}\times B5$$

At 68, the set of correction values is used to determine a new set of initial values for the next iteration. Specifically, the following expressions are used:

$$\text{Dragtorque}_n=\text{Dragtorque}_{n+1}+\text{Correction}_{dragtorque}$$

$$\text{Enginetorque}_n=\text{Enginetorque}_{n+1}+\text{Correction}_{enginetorque}$$

$$\text{Speed}_n=\text{Speed}_{n+1}+\text{Correction}_{speed}$$

Finally, at 70, the value of Dragtorque$_n$ is outputted to the shift decision control unit 38. The shift decision control unit 38 then uses this value as an input in a shift control algorithm to determine whether a vehicle shift from a current transmission gear ratio to a target transmission gear ratio should be implemented. The process then returns to block 62 and the process repeats for the next time period.

Figure 4:
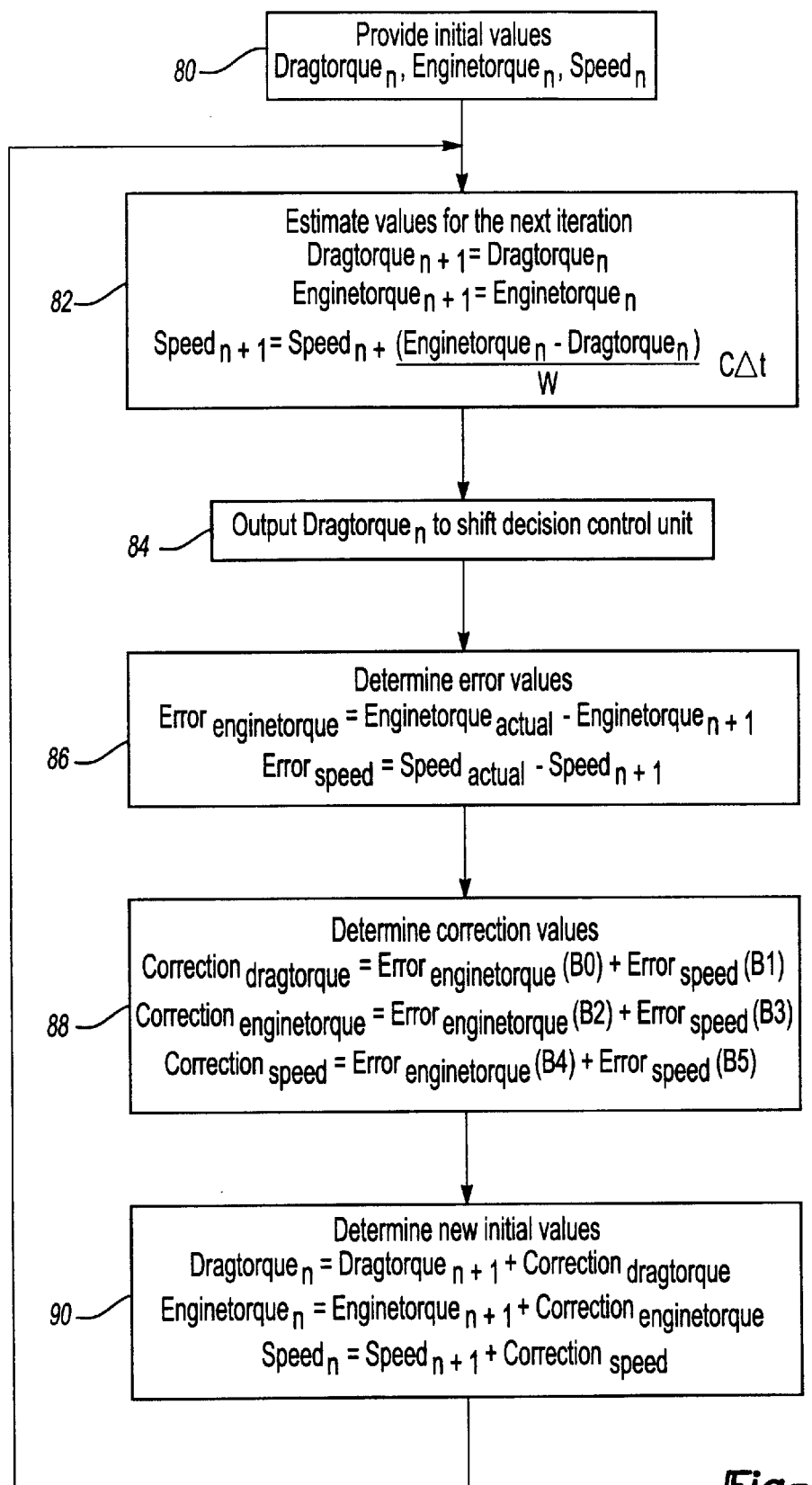
FIG. 4 is a flowchart of another embodiment of the method for determining deceleration of the vehicle during the transmission gear shift.

Referring to FIG. 4, a flowchart of an alternate embodiment of the present invention is shown. The individual steps 80, 82, 84, 86, 88 and 90 coincide with the steps in FIG. 3. However, the sequence of steps is altered such that the step of outputting the value of Dragtorque$_n$ to the shift decision control unit 38 takes place earlier in the process. Specifically, Dragtorque$_n$ is outputted in step 84 after the set of initial values is determined at 82, but before error values are calculated at 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for estimating deceleration of a wheeled vehicle during a transmission gear shift, the vehicle having a transmission system including an engine, a transmission having a plurality of gear ratios, an input shaft driven by the engine, an output shaft adapted to drive a vehicle wheel, a first signal indicative of an engine torque, and a second signal indicative of an input shaft rotational speed, the method comprising the steps of:

determining as a function of the first signal indicative of the engine torque and the second signal indicative of the input shaft rotational speed an expected vehicle deceleration value during a transmission gear ratio shift to a target gear ratio; and outputting the expected vehicle deceleration value to a shift decision control unit for implementing a transmission gear shift.

2. The method of claim 1 wherein the first signal indicative of the engine torque is measured at the output shaft of the transmission.

3. The method of claim 1 wherein the first signal indicative of the engine torque is provided by an engine control module.

4. The method of claim 1 wherein the second signal indicative of the input shaft rotational speed is measured at the output shaft of the transmission.

5. The method of claim 1 wherein the expected vehicle deceleration during the transmission gear shift is determined as a function of the expression $$Dragtorque_n * C/W$$

where:
Dragtorque$_n$ is the torque due to vehicle drag forces at a time n,
W is the gross vehicle weight, and
C is a constant.

6. The method of claim 5 wherein the value for the constant (C) is a function of the expression $$307 * (Ratio_{axle}^2 / Radius_{tire}^2)$$

where:
Ratio$_{axle}$ is the axle ratio of the vehicle, and
Radius$_{tire}$ is the radius of the tire disposed on the vehicle.

7. A method for estimating deceleration of a wheeled vehicle during a transmission gear shift, the vehicle having a transmission system including an engine, a transmission having a plurality of gear ratios, an input shaft driven by the engine, an output shaft adapted to drive a vehicle wheel, a first signal indicative of an engine torque, and a second signal indicative of an input shaft rotational speed, the method comprising the steps of:
providing a set of initial values for a current time period including an engine torque value, an input shaft rotational speed value, and a vehicle deceleration value;
determining a set of estimated values for a future time period including an estimated engine torque value, an estimated input shaft rotational speed value, and an estimated vehicle deceleration value;
providing the estimated vehicle deceleration value to a shift decision control unit for implementing a transmission gear shift;
determining a set of error values based on the first signal, the second signal, and a subset of the set of estimated values;
determining a set of correction values based on the set of error values including an engine torque correction value, an input shaft rotational speed correction value, and a vehicle deceleration correction value;
adjusting the set of estimated values using the set of correction values; and
using the set of estimated values as the set of initial values in the future time period.

8. The method of claim 7 wherein the subset of the set of estimated values comprises the estimated engine torque value and the estimated input shaft rotational speed value.

9. The method of claim 8 wherein the set of error values is determined by subtracting the estimated engine torque value from the first signal and by subtracting the estimated input shaft rotational speed value from the second signal.

10. The method of claim 7 wherein the set of correction values is calculated using the set of error values and a set of predetermined coefficients.

11. The method of claim 7 wherein the first signal indicative of the engine torque is measured at the output shaft of the transmission.

12. The method of claim 7 wherein the first signal indicative of the engine torque is provided by an engine control module.

13. The method of claim 7 wherein the second signal indicative of the input shaft rotational speed is measured at the output shaft of the transmission.

14. A method for estimating deceleration of a wheeled vehicle during a transmission gear shift, the vehicle having a transmission system including an engine, a transmission having a plurality of gear ratios, an input shaft driven by the engine, an output shaft adapted to drive a vehicle wheel, a first signal indicative of an engine torque, and a second signal indicative of an input shaft rotational speed, the method comprising the steps of:
providing a set of initial values for a current time period including an engine torque value, an input shaft rotational speed value, and a vehicle deceleration value;
determining a set of estimated values for a future time period including an estimated engine torque value, an estimated input shaft rotational speed value, and an estimated vehicle deceleration value;
determining a set of error values based on the first signal, the second signal, and a subset of the set of estimated values;
determining a set of correction values based on the set of error values including an engine torque correction value, an input shaft rotational speed correction value, and a vehicle deceleration correction value;
adjusting the set of estimated values using the set of correction values;
providing the estimated vehicle deceleration value to a shift decision control unit for implementing a transmission gear shift; and
using the set of estimated values as the set of initial values in the future time period.

15. The method of claim 14 wherein the first signal indicative of the engine torque is measured at the output shaft of the vehicle transmission.

16. The method of claim 14 wherein the first signal indicative of the engine torque is provided by an engine control module.

17. The method of claim 14 wherein the second signal indicative of the input shaft rotational speed is measured at the output shaft of the transmission.

18. The method of claim 14 wherein the subset of the set of estimated values comprises the estimated engine torque value and the estimated input shaft rotational speed value.

19. The method of claim 18 wherein the set of error values is determined by subtracting the estimated engine torque value from the first signal and by subtracting the estimated input shaft rotational speed value from the second signal.

* * * * *

UNITED STATES PATENT AND TRADEMARK OFFICE
CERTIFICATE OF CORRECTION

PATENT NO. : 6,691,011 B1
DATED : February 10, 2004
INVENTOR(S) : Craig S. Jacobs It is certified that error appears in the above-identified patent and that said Letters Patent is hereby corrected as shown below:

<u>Title page,</u>
Item [73], Assignee, please change "Southfield, MI" to read -- Cleveland, OH --.

Signed and Sealed this

Eighteenth Day of May, 2004

JON W. DUDAS
*Acting Director of the United States Patent and Trademark Office*